(12) United States Patent
Podrebarac (10) Patent No.: US 8,043,495 B2
(45) Date of Patent: Oct. 25, 2011

(54) PROCESS TO HYDRODESULFURIZE FCC GASOLINE RESULTING IN A LOW-MERCAPTAN PRODUCT

(75) Inventor: Gary G. Podrebarac, Houston, TX (US)

(73) Assignee: Catalytic Distillation Technologies, Pasadena, TX (US)

( * ) Notice: Subject to any disclaimer, the term of this patent is extended or adjusted under 35 U.S.C. 154(b) by 334 days.

(21) Appl. No.: 12/340,184

(22) Filed: Dec. 19, 2008

(65) Prior Publication Data
US 2009/0188838 A1 Jul. 30, 2009

Related U.S. Application Data

(60) Provisional application No. 61/023,556, filed on Jan. 25, 2008.

(51) Int. Cl.
*C10G 45/02* (2006.01)

(52) U.S. Cl. ............ 208/213; 208/49; 208/57; 208/212; 208/243; 208/244

(58) Field of Classification Search .................... 208/49, 208/57, 212–213, 243–244
See application file for complete search history.

(56) References Cited

U.S. PATENT DOCUMENTS

| | | | |
|---|---|---|---|
| 2,793,170 A | 5/1957 | Stiles et al. |
| 4,397,739 A | 8/1983 | Jacquin et al. |
| 4,731,229 A | 3/1988 | Sperandio |
| 5,073,236 A | 12/1991 | Gelbein et al. |
| 5,266,546 A | 11/1993 | Hearn |
| 5,431,890 A | 7/1995 | Crossland et al. |
| 5,597,476 A | 1/1997 | Hearn et al. |
| 5,730,843 A | 3/1998 | Groten et al. |
| 5,779,883 A | 7/1998 | Hearn et al. |
| 6,083,378 A | 7/2000 | Gildert et al. |
| 6,303,020 B1 | 10/2001 | Podrebarac et al. |
| 6,409,913 B1 | 6/2002 | Clark et al. |
| 6,416,658 B1 | 7/2002 | Maraschino et al. |
| 6,444,118 B1 | 9/2002 | Podrebarac et al. |

(Continued)

OTHER PUBLICATIONS

International Search Report with Written Opinion issued in PCT Applicationo No. PCT/US2009/030546 dated Aug. 21, 2009. (12 pages).

(Continued)

*Primary Examiner* — Walter Griffin
*Assistant Examiner* — Brian McCaig
(74) *Attorney, Agent, or Firm* — Osha • Liang LLP (57) ABSTRACT

A process for reducing the sulfur content of a hydrocarbon stream, including: feeding a hydrocarbon stream including sulfur compounds to a catalytic distillation reactor having one or more hydrodesulfurization reaction zones; feeding hydrogen to the catalytic distillation reactor; concurrently in the catalytic distillation reactor: fractionating the hydrocarbon stream into a heavy fraction and a light fraction; contacting hydrogen and the light fraction to form $H_2S$ and a light fraction of reduced sulfur content; recovering the light fraction, $H_2S$, and hydrogen as an overheads; recovering the heavy fraction; heating the overheads to a temperature from 500 to 700° F.; feeding the heated overheads and hydrogen to a high temperature low pressure reactor to form $H_2S$ and a reactor effluent of reduced mercaptan content; separating the reactor effluent, $H_2S$, and unreacted hydrogen to form a light hydrocarbon fraction and a fraction including $H_2S$ and hydrogen; recycling a portion of the light hydrocarbon fraction to the catalytic distillation reactor.

18 Claims, 3 Drawing Sheets

U.S. PATENT DOCUMENTS

| | | |
|---|---|---|
| 6,495,030 B1 | 12/2002 | Podrebarac |
| 6,678,830 B1 | 1/2004 | Mustafa et al. |
| 6,881,324 B2 | 4/2005 | Smith, Jr. |
| 7,074,951 B2 | 7/2006 | Ryu et al. |
| 7,125,484 B2 | 10/2006 | Smith, Jr. |
| 2003/0230518 A1 | 12/2003 | Smith |
| 2004/0129606 A1* | 7/2004 | Podrebarac et al. .......... 208/210 |
| 2009/0065396 A1* | 3/2009 | Kokayeff et al. ............. 208/210 |

OTHER PUBLICATIONS

International Preliminary Report on Patentability issued by The International Bureau of WIPO on Jul. 27, 2010 in corresponding International application No. PCT/US2009/030546 (6 pages).

\* cited by examiner

PROCESS TO HYDRODESULFURIZE FCC GASOLINE RESULTING IN A LOW-MERCAPTAN PRODUCT

CROSS-REFERENCE TO RELATED APPLICATION

This application, pursuant to 35 U.S.C. §119(e), claims priority to U.S. Provisional Application Ser. No. 61/023,556, filed Jan. 25, 2008. That application is herein incorporated by reference in its entirety.

BACKGROUND OF DISCLOSURE

1. Field of the Disclosure

Embodiments disclosed herein relate generally to a process for reducing the sulfur content of hydrocarbon streams. More specifically, embodiments disclosed herein relate to hydrodesulfurization processes with reduced formation of recombinant mercaptans.

2. Background

Petroleum distillate streams contain a variety of organic chemical components. Generally the streams are defined by their boiling ranges, which determine the composition. The processing of the streams also affects the composition. For instance, products from either catalytic cracking or thermal cracking processes contain high concentrations of olefinic materials as well as saturated (alkanes) materials and poly-unsaturated materials (diolefins). Additionally, these components may be any of the various isomers of the compounds.

The composition of untreated naphtha as it comes from the crude still, or straight run naphtha, is primarily influenced by the crude source. Naphthas from paraffinic crude sources have more saturated straight chain or cyclic compounds. As a general rule most of the "sweet" (low sulfur) crudes and naphthas are paraffinic. The naphthenic crudes contain more unsaturates, cyclic, and polycylic compounds. The higher sulfur content crudes tend to be naphthenic. Treatment of the different straight run naphthas may be slightly different depending, upon their composition due to crude source.

Reformed naphtha or reformate generally requires no further treatment except perhaps distillation or solvent extraction for valuable aromatic product removal. Reformed naphthas have essentially no sulfur contaminants due to the severity of their pretreatment for the process and the process itself.

Cracked naphtha, as it comes from the catalytic cracker, has a relatively high octane number as a result of the olefinic and aromatic compounds contained therein. In some cases, this fraction may contribute as much as half of the gasoline in the refinery pool together with a significant portion of the octane.

Catalytically cracked naphtha gasoline boiling range material currently forms a significant part (~⅓) of the gasoline product pool in the United States and is the cause of the majority of the sulfur found in gasoline. These sulfur impurities may require removal in order to comply with product specifications or to ensure compliance with environmental regulations, which may be as low as 10, 20 or 50 wppm, depending upon the jurisdiction.

The most common method of removal of the sulfur compounds is by hydrodesulfurization (HDS) in which the petroleum distillate is passed over a solid particulate catalyst comprising a hydrogenation metal supported on an alumina base. Additionally, large amounts of hydrogen are included in the feed. The hydrodesulfurization reaction results in the production of hydrogen sulfide according to the following reaction:

$RSH + H_2 \leftrightarrow R'H + H_2S$. Typical operating conditions for standard single pass fixed bed HDS reactors, such as in a trickle bed reactor, are temperatures ranging from 600° F. to 780° F., pressures ranging from 600 to 3000 psig, hydrogen recycle rates ranging from 500 to 3000 scf/bbl, and fresh hydrogen makeup ranging from 100 to 1000 scf/bbl.

After the hydrotreating is complete, the product may be fractionated or simply flashed to release the hydrogen sulfide and collect the desulfurized naphtha. In addition to supplying high octane blending components the cracked naphthas are often used as sources of olefins in other processes such as etherifications, oligomerizations, and alkylations. The conditions used to hydrotreat the naphtha fraction to remove sulfur will also saturate some of the olefinic compounds in the fraction, reducing the octane and causing a loss of source olefins. The loss of olefins by incidental hydrogenation is detrimental, reducing the octane rating of the naphtha and reducing the pool of olefins for other uses.

Various proposals have been made for removing sulfur while retaining the more desirable olefins. Because the olefins in the cracked naphtha are mainly in the low boiling fraction of these naphthas and the sulfur containing impurities tend to be concentrated in the high boiling fraction, the most common solution has been prefractionation prior to hydrotreating. The prefractionation produces a light boiling range naphtha which boils in the range of $C_5$ to about 150° F. and a heavy boiling range naphtha which boils in the range of from about 250-475° F.

The predominant light or lower boiling sulfur compounds are mercaptans while the heavier or higher boiling compounds are thiophenes and other heterocyclic compounds. The separation by fractionation alone will not remove the mercaptans. However, in the past the mercaptans have been removed by oxidative processes involving caustic washing. A combination of oxidative removal of the mercaptans followed by fractionation and hydrotreating of the heavier fraction is disclosed in U.S. Pat. No. 5,320,742. In the oxidative removal of the mercaptans the mercaptans are converted to the corresponding disulfides.

Several U.S. patents describe the concurrent distillation and desulfurization of naphtha, including U.S. Pat. Nos. 5,597,476; 5,779,883; 6,083,378; 6,303,020; 6,416,658; 6,444,118; 6,495,030 and 6,678,830. In each of these patents, the naphtha is split into two or three fractions based upon boiling point or boiling ranges.

An additional problem encountered during hydrodesulfurization is the reaction of hydrogen sulfide with olefins to form what are called recombinant mercaptans:

The formation of mercaptans during the hydrodesulfurization of FCC gasoline is well known to occur, as disclosed in U.S. Pat. No. 2,793,170. Recombinant mercaptans may form due to the relatively high concentration of hydrogen sulfide in the flash or overhead system (compared to the concentration of hydrogen sulfide within a reactive distillation column). A very important consideration in hydrodesulfurization designs is managing the amount of these recombinant mercaptans in the product.

U.S. Pat. No. 6,409,913 discloses a process to desulfurize naphtha by reacting a naphtha feed containing sulfur compounds and olefins with hydrogen in the presence of a hydrodesulfurization catalyst. As described therein, reduced recombinant mercaptan formation may be achieved at specific conditions of high temperature, low pressure, and high treat gas ratio. Although not discussed in relation to the desired high temperature, vaporization of FCC streams may result in plugging of heat exchangers and flow lines due to the polymerization of olefins, as described in U.S. Pat. No. 4,397, 739.

U.S. Pat. No. 6,416,658 a full boiling range naphtha stream is subjected to simultaneous hydrodesulfurization and splitting into a light boiling range naphtha and a heavy boiling range naphtha followed by a further hydrodesulfurization by contacting the light boiling range naphtha with hydrogen in countercurrent flow in a fixed bed of hydrodesulfurization catalyst to remove recombinant mercaptans which are formed by the reverse reaction of $H_2S$ with olefins in the naphtha during the initial hydrodesulfurization. In particular the entire recovered portion of the light naphtha from a reaction distillation column hydrodesulfurization is further contacted with hydrogen in countercurrent flow in a fixed bed of hydrodesulfurization catalyst.

Accordingly, there exists a need for processes for the hydrodesulfurization of FCC gasoline which minimizes or controls the formation of recombinant mercaptans, resulting in a hydrocarbon stream of reduced organic sulfur content.

SUMMARY OF THE DISCLOSURE

In one aspect, embodiments disclosed herein relate to a process for reducing the sulfur content of a hydrocarbon stream, the process including: feeding hydrogen and a hydrocarbon stream comprising hydrogen sulfide and mercaptans to a high temperature low pressure reactor containing a hydrodesulfurization catalyst; and contacting the hydrocarbons and mercaptans in the presence of the hydrodesulfurization catalyst at a temperature in the range of 500 to 700° F. and a pressure of less than 320 psi to form a hydrocarbon stream having a reduced mercaptan content.

In one aspect, embodiments disclosed herein relate to a process for reducing the sulfur content of a hydrocarbon stream, the process including: feeding a hydrocarbon stream comprising organic sulfur compounds to a catalytic distillation reactor system having one or more reaction zones containing a hydrodesulfurization catalyst; feeding hydrogen to the catalytic distillation reactor system; concurrently in the catalytic distillation reactor system: fractionating the hydrocarbon stream into a heavy fraction and a light fraction; contacting hydrogen and the light fraction in at least one of the reaction zones to form hydrogen sulfide and a light fraction of reduced organic sulfur content; recovering the light fraction, hydrogen sulfide, and any unreacted hydrogen as an overheads fraction; recovering the heavy fraction as a bottoms fraction; heating the overheads fraction to a temperature in the range from 500 to 700° F.; feeding the heated overheads fraction and hydrogen to a high temperature low pressure reactor containing a hydrodesulfurization catalyst to form hydrogen sulfide and a reactor effluent of reduced mercaptan content; separating the reactor effluent, hydrogen sulfide, and any unreacted hydrogen to form a light hydrocarbon fraction, and a fraction comprising hydrogen sulfide and hydrogen; recycling at least a portion of the light hydrocarbon fraction as reflux to the catalytic distillation reactor system.

In another aspect, embodiments disclosed herein relate to a process for reducing the sulfur content of a hydrocarbon stream, the process including: feeding a hydrocarbon stream comprising organic sulfur compounds to a catalytic distillation reactor system having two or more reaction zones containing a hydrodesulfurization catalyst; feeding hydrogen to the catalytic distillation reactor system to a location below each of the two or more reaction zones; concurrently in the catalytic distillation reactor system: fractionating the hydrocarbon stream into a heavy fraction and a light fraction; contacting hydrogen and the light fraction in at least one of the reaction zones to form hydrogen sulfide and a light fraction of reduced organic sulfur content; contacting hydrogen and the heavy fraction in at least one of the reaction zones to form hydrogen sulfide and a heavy fraction of reduced organic sulfur content; recovering the light fraction of reduced organic sulfur content, hydrogen sulfide, and any unreacted hydrogen as an overheads fraction; recovering the heavy fraction of reduced organic sulfur content as a bottoms fraction; heating the overheads fraction to a temperature in the range from 500 to 700° F.; feeding the heated overheads fraction, hydrogen, and a heavy hydrocarbon fraction to a high temperature low pressure reactor containing a hydrodesulfurization catalyst to form hydrogen sulfide and a reactor effluent of reduced mercaptan content; separating the reactor effluent, hydrogen sulfide, and any unreacted hydrogen to form a light hydrocarbon fraction and a fraction comprising hydrogen sulfide and hydrogen; separating at least a portion of the hydrogen sulfide from the fraction comprising hydrogen sulfide and hydrogen to form a hydrogen fraction; recycling at least a portion of the hydrogen fraction to at least one of the catalytic distillation reactor system and the high temperature low pressure reactor; recycling at least a portion of the light hydrocarbon fraction as reflux to the catalytic distillation reactor system; combining the light hydrocarbon fraction and the bottoms fraction to form a hydrocarbon stream of reduced organic sulfur content.

Other aspects and advantages will be apparent from the following description and the appended claims.

DETAILED DESCRIPTION

In one aspect, embodiments disclosed herein relate to hydrodesulfurization processes with reduced formation of recombinant mercaptans. More specifically, embodiments disclosed herein relate to catalytic distillation reactor systems in conjunction with further hydrodesulfurization process steps which discourage the formation of recombinant mercaptans.

"Recombinant mercaptans," as used herein, refers to mercaptans that are not in the feed to the present process but are the reaction products of the $H_2S$ generated by the hydrogenation of sulfur-containing compounds in the present process and alkenes in the feed. Thus, the recombinant mercaptans are not necessarily the same as those destroyed by the hydrodesulfurization of a first portion of the present process, although they may be. The present catalytic distillation hydrodesulfurization process is considered to dissociate substantially all of the mercaptans in the feed and the small amounts of mercaptans observed in the product streams are typically recombinant mercaptans. In many aspects, catalytic distillation reaction is superior to the prior art straight hydrogenation for removing mercaptans. However, catalytic distillation reaction may also allow sufficient time for some undesirable recombination reactions to occur. Thus, in embodiments disclosed herein, the combination of catalytic distillation hydrogenation reactor and a high temperature, low pressure hydrodesulfurization reactor, where the overheads from the catalytic distillation hydrogenation reactor, along with any additional hydrogen, is fed to the high temperature low pressure reactor, is sufficient to dissociate the recombinant mercaptans, resulting in a reduced overall sulfur content in the hydrocarbons being processed.

Within the scope of this application, the expression "catalytic distillation reactor system" denotes an apparatus in which the catalytic reaction and the separation of the products take place at least partially simultaneously. The apparatus may comprise a conventional catalytic distillation column reactor, where the reaction and distillation are concurrently taking place at boiling point conditions, or a distillation column combined with at least one side reactor, where the side reactor may be operated as a liquid phase reactor or a boiling point reactor. While both catalytic distillation reactor systems described may be preferred over conventional liquid phase reaction followed by separations, a catalytic distillation column reactor may have the advantages of decreased piece count, reduced capital cost, increased catalyst productivity per pound of catalyst, efficient heat removal (heat of reaction may be absorbed into the heat of vaporization of the mixture), and a potential for shifting equilibrium. Divided wall distillation columns, where at least one section of the divided wall column contains a catalytic distillation structure, may also be used, and are considered "catalytic distillation reactor systems" herein.

The hydrocarbon feed to the processes disclosed herein may be a sulfur-containing petroleum fraction which boils in the gasoline boiling range, including FCC gasoline, coker pentane/hexane, coker naphtha, FCC naphtha, straight run gasoline, pyrolysis gasoline, and mixtures containing two or more of these streams. Such gasoline blending streams typically have a normal boiling point within the range of 0° C. and 260° C., as determined by an ASTM D86 distillation. Feeds of this type include light naphthas typically having a boiling range of about $C_6$ to 165° C. (330° F.); full range naphthas, typically having a boiling range of about $C_5$ to 215° C. (420° F.), heavier naphtha fractions boiling in the range of about 125° C. to 210° C. (260° F. to 412° F.), or heavy gasoline fractions boiling in the range of about 165° C. to 260° C. (330° F. to 500° F.). In general, a gasoline fuel will distill over the range of from about room temperature to 260° C. (500° F.).

Organic sulfur compounds present in these gasoline fractions occur principally as mercaptans, aromatic heterocyclic compounds, and disulfides. Relative amounts of each depend on a number of factors, many of which are refinery, process and feed specific. In general, heavier fractions contain a larger amount of sulfur compounds, and a larger fraction of these sulfur compounds are in the form of aromatic heterocyclic compounds. In addition, certain streams commonly blended for gasoline, such as FCC feedstocks, contain high amounts of the heterocyclic compounds. Gasoline streams containing significant amounts of these heterocyclic compounds are often difficult to process using many of the prior art methods. Very severe operating conditions have been conventionally specified for hydrotreating processes to desulfurize gasoline streams, resulting in a large octane penalty. Adsorption processes, used as an alternative to hydrogen processing, have very low removal efficiencies, since the aromatic heterocyclic sulfur compounds have adsorptive properties similar to the aromatic compounds in the hydrocarbon matrix.

Aromatic heterocyclic compounds that may be removed by the processes disclosed herein include alkyl substituted thiophene, thiophenol, alkylthiophene and benzothiophene. Among the aromatic heterocyclic compounds of particular interest are thiophene, 2-methylthiophene, 3-methylthiophene, 2-ethylthiophene, benzothiophene and dimethylbenzothiophene. These aromatic heterocyclic compounds are collectively termed "thiophenes." Mercaptans that may be removed by the processes described herein often contain from 2-10 carbon atoms, and are illustrated by materials such as 1-ethanthiol, 2-propanethiol, 2-butanethiol, 2-methyl-2-propanethiol, pentanethiol, hexanethiol, heptanethiol, octanethiol, nonanethiol, and thiophenol.

Sulfur in gasoline originating from these gasoline streams may be in one of several molecular forms, including thiophenes, mercaptans and disulfides. For a given gasoline stream, the sulfur compounds tend to be concentrated in the higher boiling portions of the stream. Such a stream may be fractionated, and a selected fraction treated using the processes described herein. Alternatively, the entire stream may be treated using the processes described herein. For example, light gasoline streams that are particularly rich in sulfur compounds, such as coker pentane/hexane, may be suitably treated as a blend stream which also contains a higher boiling, lower sulfur containing component.

In general, gasoline streams suited for treatment using the processes disclosed herein contain greater than about 10 ppm thiophenic compounds. Typically, streams containing more than 40 ppm thiophenic compounds, up to 2000 ppm thiophenic compounds and higher may be treated using the processes as described herein. The total sulfur content of the gasoline stream to be treated using the processes disclosed herein will generally exceed 50 ppm by weight, and typically range from about 150 ppm to as much as several thousand ppm sulfur. For fractions containing at least 5 volume percent boiling over about 380° F. (over about 193° C.), the sulfur content may exceed about 1000 ppm by weight, and may be as high as 4000 to 7000 ppm by weight or even higher.

In addition to the sulfur compounds, naphtha feeds, including FCC naphtha, may include paraffins, naphthenes, and aromatics, as well as open-chain and cyclic olefins, dienes, and cyclic hydrocarbons with olefinic side chains. A cracked naphtha feed useful in the processes described herein may have an overall olefins concentration ranging from about 5 to 60 weight percent in some embodiments; from about 25 to 50 weight percent in other embodiments.

In general, systems described herein may treat a naphtha or gasoline fraction in a catalytic distillation column reactor system. The catalytic distillation reactor system may have one or more reactive distillation zones containing hydrodesulfurization catalyst. For example, reactive distillation zones may be contained within the stripping section, hydrodesulfurizing the heavier compounds, within the rectification section, hydrodesulfurizing the lighter compounds, or both.

The catalytic distillation step may be carried out at a temperature in the range of 400° F. to 800° F. at 50 to 400 psig pressure with hydrogen partial pressure in the range of 0.1 to 100 psi at 20 to 1200 scf/bbl at weight hourly space velocities (WHSV) in the range of 0.1 to 10 $hr^{-1}$ based on feed rate and a particulate catalyst packaged in structures. If advanced specialty catalytic structures are used (where catalyst is one with the structure rather than a form of packaged pellets to be held in place by structure), the LHSV for such systems should be about in the same range as those of particulate or granular-based catalytic distillation catalyst systems as just referenced. As can be seen, the conditions suitable for the desulfurization of naphtha in a distillation column reactor system are very different from those in a standard trickle bed reactor, especially with regard to total pressure and hydrogen partial pressure. In other embodiments, conditions in a reaction distillation zone of a naphtha hydrodesulfurization distillation column reactor system are: temperatures in the range from 450° F. to 700° F., total pressure in the range from 75 to 300 psig, hydrogen partial pressure in the range from 6 to 75 psia, WHSV of naphtha in the range from about 1 to 5, and hydrogen feed rates in the range from 10-1000 scf/bbl.

The operation of the distillation column reactor results in both a liquid and a vapor phase within the distillation reaction zone. A considerable portion of the vapor is hydrogen, while a portion of the vapor is hydrocarbons from the hydrocarbon feed. In the catalytic distillation it has been proposed that the mechanism that produces the effectiveness of the process is the condensation of a portion of the vapors in the reaction system, which occludes sufficient hydrogen in the condensed liquid to obtain the requisite intimate contact between the hydrogen and the sulfur compounds in the presence of the catalyst to result in their hydrogenation. In particular, sulfur species concentrate in the liquid while the olefins and $H_2S$ concentrate in the vapor allowing for high conversion of the sulfur compounds with low conversion of the olefin species. The result of the operation of the process in the catalytic distillation reactor system is that lower hydrogen partial pressures (and thus lower total pressures) may be used, as compared to typical fixed bed hydrodesulfurization processes.

As in any distillation, there is a temperature gradient within the catalytic distillation reactor system. The lower end of the column contains higher boiling material and thus is at a higher temperature than the upper end of the column. The lower boiling fraction, which contains more easily removable sulfur compounds, is subjected to lower temperatures at the top of the column, which may provide for greater selectivity, that is, no hydrocracking or less saturation of desirable olefinic compounds. The higher boiling portion is subjected to higher temperatures in the lower end of the distillation column reactor to crack open the sulfur containing ring compounds and hydrogenate the sulfur. The heat of reaction simply creates more boil up, but no increase in temperature at a given pressure. As a result, a great deal of control over the rate of reaction and distribution of products can be achieved by regulating the system pressure.

Catalysts useful as the hydrodesulfurization catalyst in the reactive distillation zone of the catalytic distillation reactor system may include Group VIII metals, such as cobalt, nickel, palladium, alone or in combination with other metals, such as molybdenum or tungsten, on a suitable support, which may be alumina, silica-alumina, titania-zirconia or the like. Normally the metals are provided as the oxides of the metals supported on extrudates or spheres and as such are not generally useful as distillation structures. Alternatively, catalyst may be packaged in a suitable catalytic distillation structure, which characteristically can accommodate a wide range of typically manufactured fixed-bed catalyst sizes.

The catalysts may contain components from Group V, VIB, VIII metals of the Periodic Table or mixtures thereof. The use of the distillation column reactor system may reduce the deactivation of catalyst and may provide for longer runs than the fixed bed hydrogenation units of the prior art. The Group VIII metal may also provide increased overall average activity. Catalysts containing a Group VIB metal, such as molybdenum, and a Group VIII metal, such as cobalt or nickel, are preferred. Catalysts suitable for the hydrodesulfurization reaction include cobalt-molybdenum, nickel-molybdenum and nickel-tungsten. The metals are generally present as oxides supported on a neutral base such as alumina, silica-alumina or the like. The metals are reduced to the sulfide either in use or prior to use by exposure to sulfur compound containing streams and hydrogen.

The catalyst may also catalyze the hydrogenation of the olefins and polyolefins contained within the light cracked naphtha and to a lesser degree the isomerization of some of the mono-olefins. The hydrogenation, especially of the mono-olefins in the lighter fraction, may not be desirable.

The catalyst typically is in the form of extrudates having a diameter of ⅛, 1/16 or 1/32 inches and an L/D of 1.5 to 10. The catalyst also may be in the form of spheres having similar diameters. They may be directly loaded into standard single pass fixed bed reactors which include supports and reactant distribution structures. However, in their regular form they form too compact a mass for operation in the catalytic distillation hydrodesulfurization tower and must then be prepared in the form of a catalytic distillation structure. The catalytic distillation structure must be able to function as catalyst and as mass transfer medium. The catalyst must be suitably supported and spaced within the column to act as a catalytic distillation structure.

In some embodiments, the catalyst is contained in a structure as disclosed in U.S. Pat. No. 5,730,843, which is hereby incorporated by reference. In other embodiments, catalyst is contained in a plurality of wire mesh tubes closed at either end and laid across a sheet of wire mesh fabric such as demister wire. The sheet and tubes are then rolled into a bale for loading into the distillation column reactor. This embodiment is described, for example, in U.S. Pat. No. 5,431,890, which is hereby incorporated by reference. Other useful catalytic distillation structures are disclosed in U.S. Pat. Nos. 4,731,229, 5,073,236, 5,431,890 and 5,266,546, which are each incorporated by reference.

Rather than the typical overhead condensation/reflux system, such as that described in U.S. Pat. No. 7,074,951, the overheads from the catalytic distillation reactor systems described herein may pass through a control valve to reduce the pressure of the stream to below about 250 psig, if necessary. Additional hydrogen may also be added, diluting the concentration of $H_2S$ in the overhead stream. At this point, the overheads fraction from the catalytic distillation reactor system includes various hydrocarbons, mercaptans, hydrogen, and hydrogen sulfide. The hydrogen sulfide may be present, for example, at a partial pressure ranging from 0.05 psi to 5 psi; from 0.1 to 2 psi in other embodiments; and from 0.1 to 1 psi in yet other embodiments. On a molar basis, the diluted overhead stream may include hydrogen sulfide, in some embodiments, at a concentration in the range from 0.03 to 4 mole percent; from 0.1 to 1 mole percent in other embodiments; and from 0.2 to 0.5 mole percent in yet other embodiments.

The overhead fraction may then be superheated, such as to temperatures greater than 600° F., and fed to a high temperature low pressure (HTLP) reactor to further treat the overhead fraction, further reducing the mercaptans and reducing or preventing the formation of recombinant mercaptans. Typical operating pressures for the HTLP reactor may range from 5 to 320 psig in some embodiments; from 10 to 250 psig in other embodiments; from 25 to 230 psig in other embodiments; from 50 to 200 psig in other embodiments; from 60 to 150 psi in other embodiments; from 70 to 125 psig in other embodiments; from 160 to 250 psig in other embodiments; and from 175 to 225 psig in yet other embodiments. Operating temperatures in the HTLP reactor may range from 500° F. to 700° F. in some embodiments; from 575° F. to 675° F. in other embodiments; and from 600° F. to 650° F. in yet other embodiments. Additional hydrogen may also be fed to the HTLP reactor, diluting the concentration of $H_2S$ in the HTLP reactor and providing additional hydrogen for any further hydrodesulfurization that may occur in the HTLP reactor. In some embodiments, the combined hydrogen in the feed to the HTLP reactor (including hydrogen in the overhead stream and the added hydrogen) may be less than 2500 scf/barrel of hydrocarbon in the overhead stream; less than 2000 scf/barrel in other embodiments; less than 1750 scf/barrel in other embodiments; less than 1000 scf/barrel in other embodiments; and less than 750 scf/barrel in yet other embodiments. In other embodiments, the combined hydrogen in the feed to the HTLP reactor may range from about 100 to about 2000 scf/barrel; from about 125 to about 1750 scf/barrel in other embodiments; and from 150 to 1500 scf/barrel in yet other embodiments. The combination of high temperature and low pressure used in the HTLP reactor is not conducive to recombinant mercaptan formation, allowing the reactor effluent to have a reduced mercaptan content. Additionally, as the feed to the heat exchanger and the HTLP is vapor from the catalytic distillation reactor system, fouling of the heat exchanger and reactors, as noted previously, may be reduced or eliminated.

Hydrodesulfurization catalysts described above with relation to the operation of the catalytic distillation reactor system may also be used in the HTLP reactor. In selected embodiments, catalysts used in the HTLP reactor may include hydrodesulfurization catalysts that favor the desulfurization of mercaptan species, which are among the easiest to convert to hydrogen sulfide. Conditions in the HTLP reactor, including high temperature and high hydrogen mole fractions, are conducive to olefin saturation. For preservation of olefin content and conversion of mercaptans to hydrogen sulfide at these conditions, suitable catalysts may include nickel catalysts with very low molybdenum promotion, or no promoters at all, and molybdenum catalysts with very low copper promotion, or no promoters at all. Such catalysts may have lower hydrogenation activity, promoting the desulfurization of the mercaptan species without significant loss of olefins.

Effluent from the HTLP reactor may be condensed in one or more stages, separating the hydrocarbons from the hydrogen sulfide and the hydrogen. The recovered hydrogen may be compressed and recycled to various portions of the hydrodesulfurization systems described herein.

A portion of the hydrocarbons with a reduced sulfur content recovered in the condensation stage(s) may be used as reflux for control of vapor and liquid traffic in the distillation column reactor system. The remaining portion of the recovered hydrocarbons may be combined with the heavies from the catalytic distillation reactor system and further processed, such as in a distillation column to recover a light hydrocarbon fraction, such as $C_5$ and lighter hydrocarbons, from heavier hydrocarbons, such as $C_6$ and heavier hydrocarbons.

In some embodiments, the catalytic distillation reactor system described above may contain one or more hydrodesulfurization reaction zones. For such systems containing only one reaction zone, the reaction zone should be located in the rectification portion of the column, contacting the light portion of the feed with the hydrodesulfurization catalyst. Hydrodesulfurization of the heavy fraction may occur in the catalytic distillation reactor system, such as where a reaction zone is additionally located in the stripping portion of the column. Optionally, the heavy portion may be hydrodesulfurized in a stand alone reactor, such as a fixed bed reactor containing a hydrodesulfurization catalyst.

In other embodiments, a portion of the catalytic distillation reactor system bottoms fraction may be fed to the HTLP reactor. The bottoms fraction is a very low olefin stream. Adding this stream to the HTLP feed may aid in dilution of the hydrogen sulfide and olefins, and further discourage recombinant mercaptan formation. One drawback of this option is that the bottoms fraction fed to the HTLP reactor would need to be vaporized in a heat exchanger, which may lead to some fouling. However, the benefits of dilution may be significant enough to warrant this option.

In some embodiments, at least a portion of the hydrocarbons recovered from the distillation column (separating a light hydrocarbon fraction from a heavy hydrocarbon fraction) may be fed to the HTLP reactor. For example, the hydrocarbons recovered from the distillation column may be processed in a re-run column. The re-run column may be used to split the recovered hydrocarbons into two or more gasoline fractions, such as a light gasoline and a heavy gasoline. A portion of the heavy gasoline may be fed to the HTLP reactor, creating a similar dilution effect as described above.

Reduction of mercaptans obtained in the HTLP reactor may be significant. In some embodiments, up to 70 mole percent of the mercaptans in the overhead fraction may be converted to hydrogen sulfide in the HTLP reactor. In some embodiments, up to 75 mole percent of the mercaptans in the overhead fraction may be converted in the HTLP reactor; and up to 80 mole percent of the mercaptans may be converted in yet other embodiments.

In some embodiments, such as in the above-described options where heavier components are processed through the HTLP reactor, the presence of heavier components in the column reflux may result in a decreased catalytic distillation reactor system operating pressure, and may dilute the olefins and hydrogen sulfide in the HTLP reactor feed. The decrease in operating pressure may synergistically benefit the overall process, resulting in an enhanced reduction in mercaptan content for the overall system. Dilution may also result in a decrease driving force for the reverse reaction (recombinant mercaptan formation) as well as aid in olefin preservation. In some embodiments, up to 75 mole percent of the mercaptans in the feed may be converted in embodiments of the hydrodesulfurization system described herein; up to 80 mole percent of the mercaptans in the feed may be converted in other embodiments; up to 85 mole percent in other embodiments; up to 90 mole percent in other embodiments; and up to 95 mole percent or higher in yet other embodiments.

In addition to the benefit of lowering distillation column reactor system vapor pressure, processing at least a portion of the heavy fraction in the HTLP reactor may also reduce hydrogen consumption or hydrogen requirements. A heavy gasoline fraction recycle may dilute the olefins and hydrogen sulfide in the overhead fraction fed to the HTLP reactor. This may reduce the amount of hydrogen required to provide dilution in the HTLP reactor, and may also reduce the pressure drop across the control valve. This non-hydrogen dilution of the HTLP reactor feed may in turn reduce the power required to run the compressor, due to decreased hydrogen traffic.

After treatment according to the processes described herein, the sulfur content of the treated stream may be less than about 50 ppm in some embodiments; less than 40 ppm in other embodiments; less than 30 ppm in other embodiments; less than 20 ppm in other embodiments; less than 10 ppm in other embodiments; less than 5 ppm in other embodiments; and less than 1 ppm in yet other embodiments, where each of the above are based on weight. The gasoline may have a total sulfur content of less than 20 mg/l in other embodiments; less than 10 mg/l in other embodiments; less than 5 mg/l in other embodiments; and less than 1 mg/l in yet other embodiments.

In contrast to typical hydrodesulfurization processes, which typically use harsh operating conditions resulting in significant loss of olefins, desulfurized products resulting from the processes disclosed herein may retain a significant portion of the olefins, resulting in a higher value end product. In some embodiments, products resulting from the processes described herein may have an overall olefins concentration ranging from 5 to 55 weight percent; from about 10 to about 50 weight percent in other embodiments; and from about 20 to about 45 weight percent in other embodiments.

Figure 1:
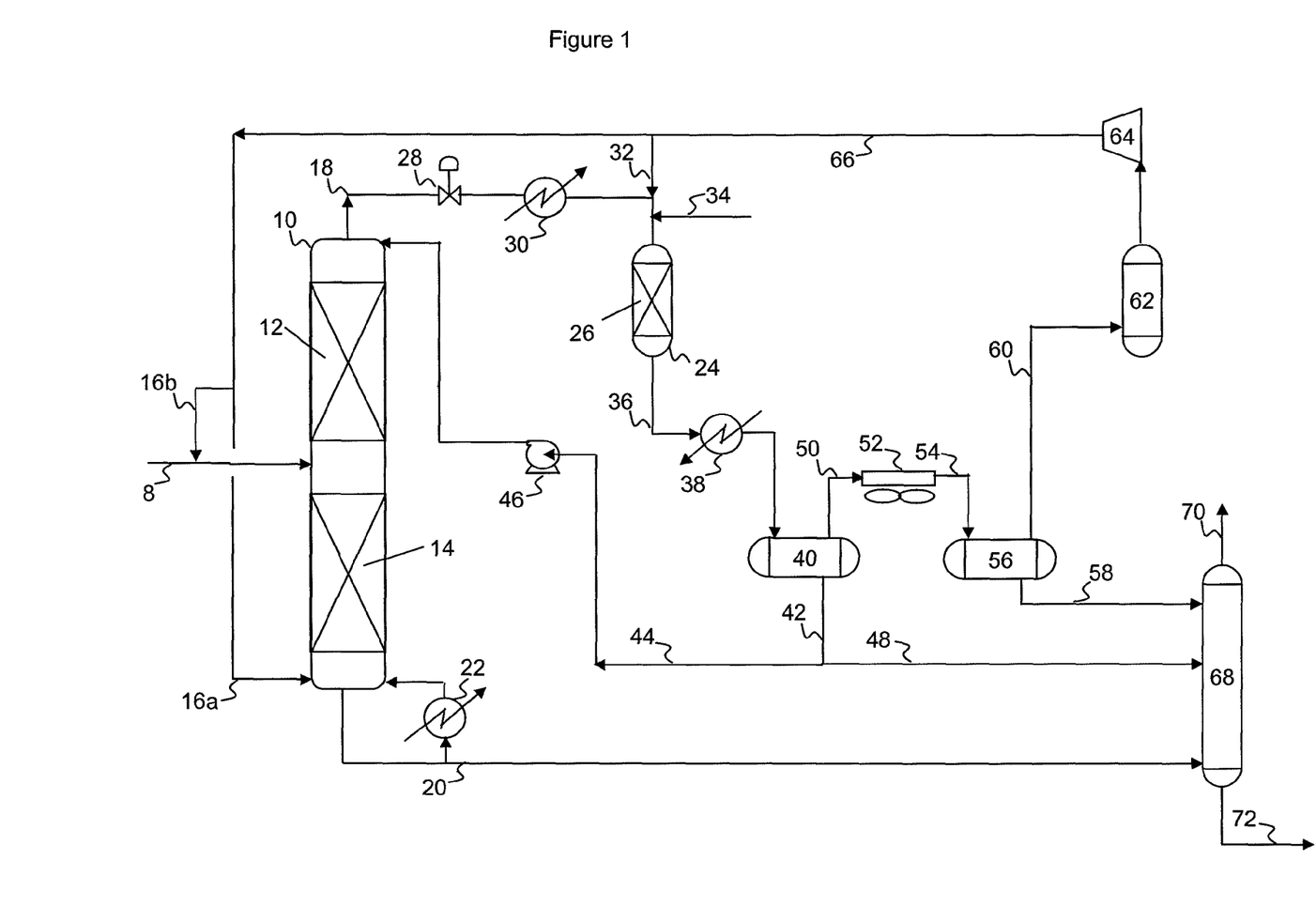
FIG. 1 is a simplified process flow diagram illustrating a process for hydrodesulfurizing a hydrocarbon feed according to embodiments disclosed herein.

Referring now to FIG. 1, a simplified process flow diagram of one embodiment of the hydrodesulfurization processes disclosed herein is illustrated. A naphtha or other sulfur-containing hydrocarbon feed may be fed via flow line 8 to a distillation column reactor system 10 having one or more reactive distillation zones; as illustrated, having two reactive distillation zones 12, 14, for hydrodesulfurizing the naphtha feed. In some embodiments, the naphtha may be fed between the two reactive distillation zones 12, 14. Hydrogen may be fed below both reactive distillation zones 12, 14 via lines 16a, 16b. The light naphtha is boiled up into the reactive rectification section 12 and removed along with unreacted hydrogen and hydrogen sulfide as an overheads fraction via flow line 18. The heavy naphtha travels down the column into reactive distillation section 12, and may be recovered via flow line 20. Unreacted hydrogen and hydrogen sulfide produced from the hydrodesulfurization of the heavy naphtha in reactive distillation zone 14 boils up through reactive distillation zone 12 and is collected with the overheads fraction via flow line 18. The catalytic distillation reactor system 10 has a reboiler 22, for maintaining temperature control and vapor/liquid traffic within column 10.

The mercaptan concentration in the overheads fraction may be further reduced by passing the overheads fraction through a high temperature, low pressure (HTLP) reactor 24, containing a hydrodesulfurization catalyst in a reaction zone 26. Prior to entering HTLP reactor 24, if necessary, the pressure of the overheads fraction in flow line 18 may be reduced across pressure control valve 28, and the overheads fraction may be heated in a heat exchanger 30 to result in the desired temperature and pressure. Hydrogen may be supplied to HTLP reactor 24 via hydrogen recycle line 32 or hydrogen make-up line 34. Hydrogen recycle line 32 may also contain some hydrogen sulfide for catalyst preservation, as mentioned previously.

Effluent from HTLP reactor 24 may be recovered via flow line 36. A portion of the hydrocarbons in the HTLP reactor 24 effluent may be condensed in chiller 38, and separated from the non-condensed hydrocarbons, hydrogen, and hydrogen sulfide in accumulator 40. The condensed hydrocarbons may be recovered from accumulator 40 via flow line 42, a portion of which may be fed as reflux to distillation column reactor system 10 via flow line 44 and pump 46. The remaining portion of the condensed hydrocarbons may be recovered via flow line 48.

The non-condensed hydrocarbons may be recovered from accumulator 40 via flow line 50, and may undergo further heat exchange or other means to condense additional hydrocarbons, such as an air cooler 52. The mixed phase effluent from air cooler 52 may pass via flow line 54 to vessel 56, from which the condensate may be recovered via flow line 58, and the non-condensed hydrogen and hydrogen sulfide recovered via flow line 60.

The hydrogen and hydrogen sulfide vapors recovered via flow line 60 may then be scrubbed to remove hydrogen sulfide, such as in a scrubber 62, and the hydrogen may then be recycled. The hydrogen may be compressed using a compressor 64 for recycle to the distillation column reactor system 10 and HTLP reactor 24 via flow line 66, which may feed each of flow lines 16a, 16b, and 32.

In some embodiments, hydrocarbons recovered via flow lines 20, 48, and 58 may be combined in a flash vessel 68, or other suitable vessels (including distillation columns), where light hydrocarbons, such as $C_5$ and lighter hydrocarbons, as well as any hydrogen sulfide that may be in streams 20, 48, and 58, may be recovered via flow line 70, and the combined naphtha streams having a reduced sulfur content may be recovered via flow line 72.

Figure 2:
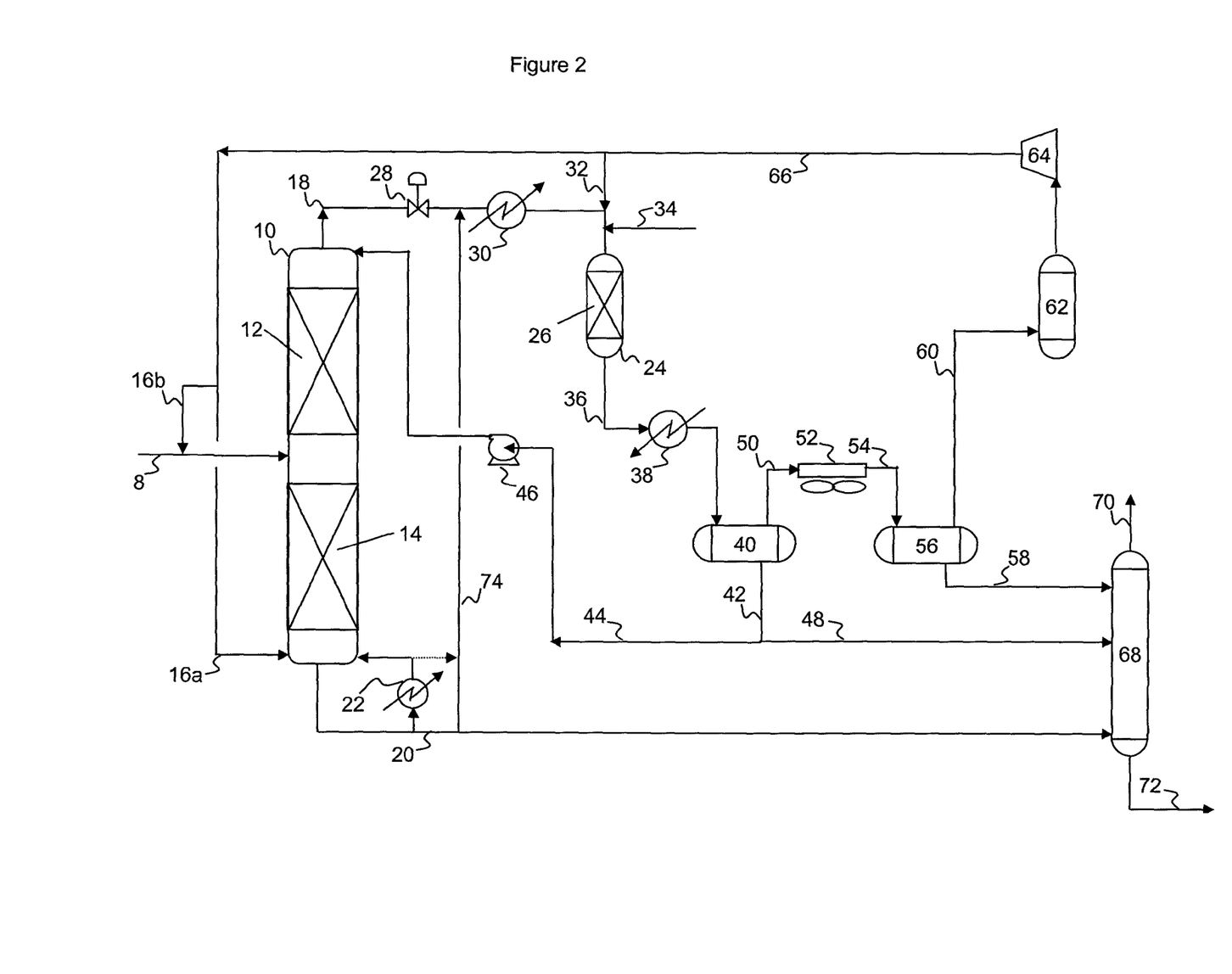
FIG. 2 is a simplified process flow diagram illustrating a process for hydrodesulfurizing a hydrocarbon feed according to embodiments disclosed herein.

As discussed above, optionally a portion of the heavy naphtha, recovered via flow line 20, may be passed through the HTLP reactor 24, as illustrated in FIG. 2, where like numerals represent like parts. In this embodiment, a portion of the bottoms fraction in flow line 20, or optionally liquid/vapor from reboiler 22, may be fed upstream of heater 30 via flow line 74.

Figure 3:
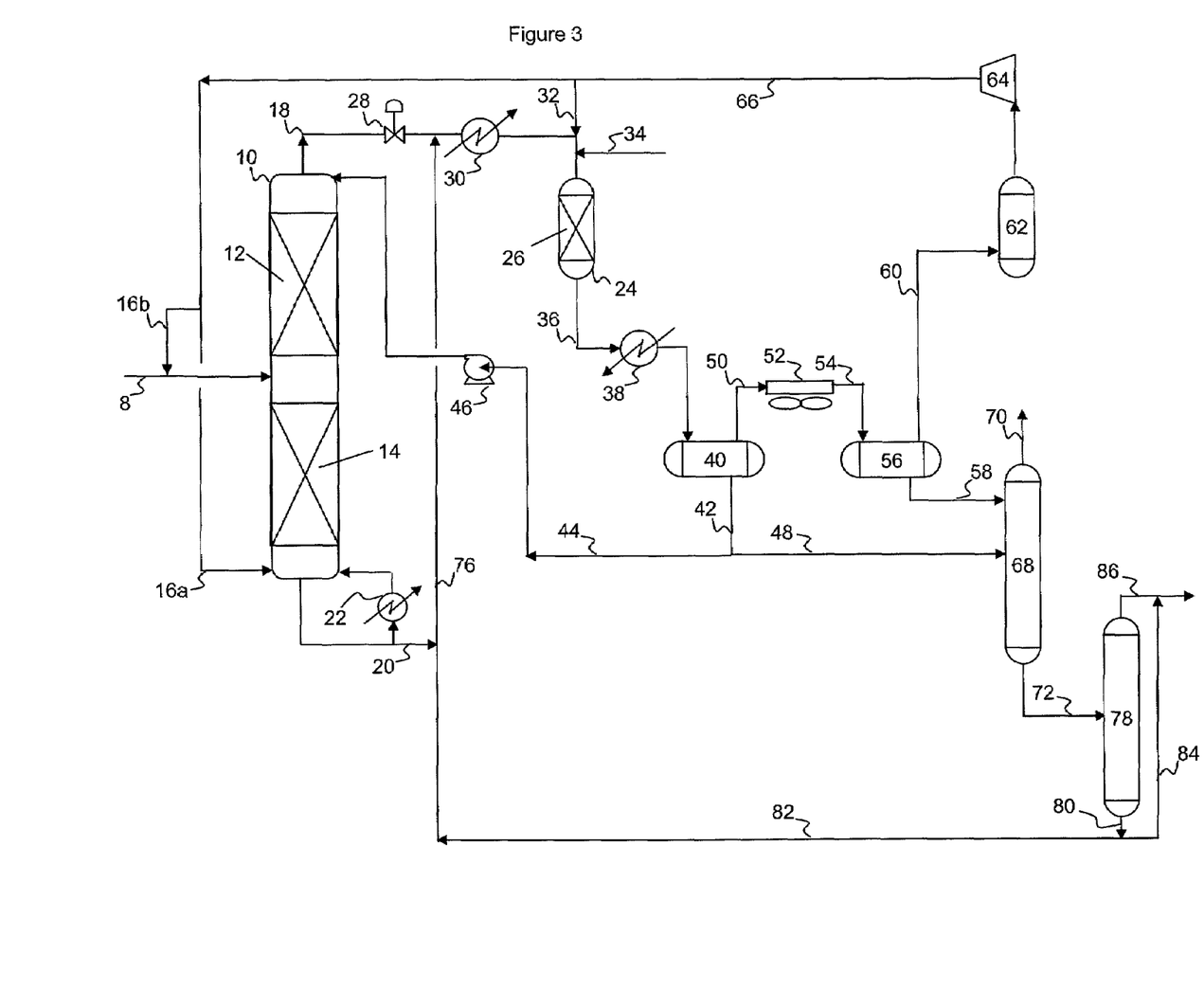
FIG. 3 is a simplified process flow diagram illustrating a process for hydrodesulfurizing a hydrocarbon feed according to embodiments disclosed herein.

Another alternative flow scheme is illustrated in FIG. 3, where like numerals represent like parts. In this embodiment, the entire bottoms fraction in flow line 20 may be passed to HTLP reactor 24 via flow line 76. Additionally, the mixed naphtha recovered via flow line 72 may be processed in a re-run column 78, separating a heavy gas fraction from a light gas fraction. The heavy gas fraction may be recovered via flow line 80, a portion of which may be passed to HTLP reactor 24 via flow line 82. The remaining portion of the heavy gas fraction may be recovered via flow line 84, which may be combined with the light gas fraction recovered from re-run column 78 via flow line 86.

The benefits of using heavier compounds in the HTLP reactor, as discussed above in relation to FIGS. 2 and 3, may include one or more of dilution of the hydrogen sulfide and olefins in the HTLP reactor feed, reduced hydrogen dilution requirements in the HTLP reactor, improved olefin retention, reduced compressor power requirements, and lower catalytic distillation reactor system operating pressures. These benefits may, in turn, result in improved mercaptan conversion, decreased olefin hydrogenation, and decreased recombinant mercaptan formation.

EXAMPLES

A simulation of the flow scheme in FIG. 3 was performed, where the simulation was converged to determine the conditions at the inlet of the HTLP reactor. In the simulation, 50 lb/h FCC gasoline is fed to the catalytic distillation column reactor along with 35 scfh hydrogen, fed to the reboiler. The overhead pressure of the catalytic distillation column reactor is 260 psia, and the overheads temperature is 516° F. The overheads from the distillation column reactor are then combined with 35 scfh additional hydrogen and a recycle of heavy gasoline product (350° F.+). The combined stream then passes through a heat exchanger, resulting in the conditions for the feed to the HTLP reactor. The HTLP reactor is operated at a pressure 50 psi less than the distillation column reactor system, and the temperature of the HTLP feed is 619° F.

The partial pressure of hydrogen sulfide is reduced from 0.96 psi in the distillation column reactor system overheads, down to 0.698 psi at the inlet of the HTLP reactor. This dilution, coupled with the increase in temperature to 619° F. in the HTLP reactor, is used to estimate the performance of the HTLP reactor, and it is estimated that the mercaptan content in the product gasoline stream is reduced by about 76 percent.

This significant reduction in the amount of mercaptans (RSH) in the product increases the total S conversion of the process, as well as decreasing the amount of mercaptan in the product. Removal of mercaptans in the product may be particularly desirable as mercaptans may contribute to corrosion in automobiles and typically must be removed before the gasoline can be sold. Thus, benefits from the processes described herein may additionally be realized in downstream operations.

Advantageously, embodiments disclosed herein may provide for reduced mercaptan content in a desulfurized naphtha stream. The reduced mercaptan content may be achieved without the need for stripping the gasoline of hydrogen sulfide prior to further treatment, which may reduce the complexity of the flow scheme and reduce the capital cost of the process. Additionally, embodiments disclosed herein advantageously provide for control or reduction of recombinant mercaptan formation.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process for reducing the sulfur content of a hydrocarbon stream, the process comprising:
    feeding a hydrocarbon stream comprising organic sulfur compounds to a catalytic distillation reactor system having one or more reaction zones comprising a hydrodesulfurization catalyst;
    feeding hydrogen to the catalytic distillation reactor system;
    concurrently in the catalytic distillation reactor system:
        fractionating the hydrocarbon stream into a heavy fraction and a light fraction;
        contacting hydrogen and the light fraction in at least one of the reaction zones to form hydrogen sulfide and a light fraction of reduced organic sulfur content;
        recovering the light fraction, hydrogen sulfide, and any unreacted hydrogen as an overheads fraction;
        recovering the heavy fraction as a bottoms fraction;
    heating the overheads vapor fraction to a temperature in the range from 500 to 700° F.;
    feeding the heated overheads vapor fraction and hydrogen to a high temperature low pressure reactor comprising a hydrodesulfurization catalyst to form hydrogen sulfide and a reactor effluent of reduced mercaptan content;
    separating the reactor effluent, hydrogen sulfide, and any unreacted hydrogen to form a light hydrocarbon fraction, and a fraction comprising hydrogen sulfide and hydrogen;
    recycling at least a portion of the light hydrocarbon fraction as reflux to the catalytic distillation reactor system.

2. The process of claim 1, further comprising decreasing a pressure of the overheads vapor fraction.

3. The process of claim 1, wherein a pressure in the high temperature low pressure reactor is in the range from 25 to 320 psig.

4. The process of claim 1, further comprising contacting the bottoms fraction with hydrogen in the presence of a hydrodesulfurization catalyst to form a heavy fraction of reduced organic sulfur content.

5. The process of claim 1, further comprising concurrently:
    contacting the heavy fraction with hydrogen in a reaction zone of the catalytic distillation column reactor to form hydrogen sulfide and a heavy fraction of reduced organic sulfur content; and
    fractionating the hydrogen sulfide and the heavy fraction of reduced organic sulfur content.

6. The process of claim 1, further comprising:
    separating at least a portion of the hydrogen sulfide from the fraction comprising hydrogen and hydrogen sulfide; and
    recycling at least a portion of the hydrogen to at least one of the distillation column reactor system and the high temperature low pressure reactor.

7. The process of claim 1, further comprising feeding at least a portion of the bottoms fraction to the high temperature low pressure reactor.

8. The process of claim 1, further comprising combining the bottoms fraction and the light hydrocarbon fraction.

9. The process of claim 8, further comprising:
    fractionating the combined fractions to form a fraction comprising $C_5$ and lighter hydrocarbons and a fraction comprising $C_6$ and heavier hydrocarbons.

10. The process of claim 9, further comprising feeding at least a portion of the $C_6$ and heavier hydrocarbons to the high temperature low pressure reactor.

11. The process of claim 1, wherein the hydrocarbon stream comprises a full range cracked naphtha.

12. The process of claim 1, wherein the feeding the hydrogen comprises feeding the hydrogen to a location below each of the one or more reaction zones in the catalytic distillation reactor system.

13. The process of claim 1, wherein the hydrodesulfurization catalyst in the high temperature low pressure reactor comprises at least one of nickel catalysts with molybdenum promotion, nickel catalysts with no promoters; molybdenum catalysts with copper promotion, and molybdenum catalysts with no promoters.

14. A process for reducing the sulfur content of a hydrocarbon stream, the process comprising:
    feeding a hydrocarbon stream comprising organic sulfur compounds to a catalytic distillation reactor system having two or more reaction zones comprising a hydrodesulfurization catalyst;
    feeding hydrogen to the catalytic distillation reactor system to a location below each of the two or more reaction zones;
    concurrently in the catalytic distillation reactor system:
        fractionating the hydrocarbon stream into a heavy fraction and a light fraction;
        contacting hydrogen and the light fraction in at least one of the reaction zones to form hydrogen sulfide and a light fraction of reduced organic sulfur content;
        contacting hydrogen and the heavy fraction in at least one of the reaction zones to form hydrogen sulfide and a heavy fraction of reduced organic sulfur content;
        recovering the light fraction of reduced organic sulfur content, hydrogen sulfide, and any unreacted hydrogen as an overheads fraction;
        recovering the heavy fraction of reduced organic sulfur content as a bottoms fraction;
    heating the overheads fraction to a temperature in the range from 500 to 700° F.;
    feeding the heated overheads fraction, hydrogen, and a heavy hydrocarbon fraction to a high temperature low pressure reactor comprising a hydrodesulfurization catalyst to form hydrogen sulfide and a reactor effluent of reduced mercaptan content;
    separating the reactor effluent, hydrogen sulfide, and any unreacted hydrogen to form a light hydrocarbon fraction and a fraction comprising hydrogen sulfide and hydrogen;

separating at least a portion of the hydrogen sulfide from the fraction comprising hydrogen sulfide and hydrogen to form a hydrogen fraction;

recycling at least a portion of the hydrogen fraction to at least one of the catalytic distillation reactor system and the high temperature low pressure reactor;

recycling at least a portion of the light hydrocarbon fraction as reflux to the catalytic distillation reactor system;

combining the light hydrocarbon fraction and the bottoms fraction to form a hydrocarbon stream of reduced organic sulfur content.

15. The process of claim 14, further comprising feeding at least a portion of the bottoms fraction to the high temperature low pressure reactor as the heavy hydrocarbon fraction.

16. The process of claim 14, further comprising feeding at least a portion of the hydrocarbon stream of reduced organic sulfur content to the high temperature low pressure reactor as the heavy hydrocarbon fraction.

17. The process of claim 14, further comprising separating the hydrocarbon stream of reduced organic sulfur content to form a fraction comprising $C_5$ and lighter hydrocarbons and a fraction comprising $C_6$ and heavier hydrocarbons.

18. The process of claim 17, further comprising feeding at least a portion of the $C_6$ and heavier hydrocarbons to the high temperature low pressure reactor as the heavy hydrocarbon fraction.

\* \* \* \* \*